(12) United States Patent
Moner Poy et al.

(10) Patent No.: US 11,166,233 B2
(45) Date of Patent: Nov. 2, 2021

(54) WIRELESS COMMUNICATION SYSTEM AND METHOD OF MANAGING ENERGY CONSUMPTION OF A WIRELESS DEVICE

(71) Applicant: Carrier Corporation, Palm Beach Gardens, FL (US)

(72) Inventors: Hector Moner Poy, Cork (IE); Ankit Tiwari, Natick, MA (US); Daniele Campana, Cork (IE); Pedro Fernandez Orellana, Shanghai (CN)

(73) Assignee: CARRIER CORPORATION, Palm Beach Gardens, FL (US)

( * ) Notice: Subject to any disclaimer, the term of this patent is extended or adjusted under 35 U.S.C. 154(b) by 124 days.

(21) Appl. No.: 16/490,291

(22) PCT Filed: Mar. 1, 2018

(86) PCT No.: PCT/US2018/020435
§ 371 (c)(1),
(2) Date: Aug. 30, 2019

(87) PCT Pub. No.: WO2018/160823
PCT Pub. Date: Sep. 7, 2018

(65) Prior Publication Data
US 2020/0077336 A1 Mar. 5, 2020

Related U.S. Application Data

(60) Provisional application No. 62/466,175, filed on Mar. 2, 2017.

(51) Int. Cl.
*H04W 88/16* (2009.01)
*H04W 52/02* (2009.01)
*H04L 12/26* (2006.01)

(52) U.S. Cl.
CPC ......... *H04W 52/0216* (2013.01); *H04L 43/10* (2013.01); *H04W 52/0219* (2013.01);
(Continued)

(58) Field of Classification Search
CPC .............................. H04L 43/10; H04W 88/16
(Continued)

(56) References Cited

U.S. PATENT DOCUMENTS 8,134,942 B2  3/2012 Messinger et al.
8,627,127 B2  1/2014 Mucignat et al.
(Continued)

FOREIGN PATENT DOCUMENTS

CA  2982393 A1  1/2017
EP  2844014 A1  3/2015
(Continued)

OTHER PUBLICATIONS

ISR and WO for Application No. PCT/US2018/020435 dated Aug. 22, 2018; 28 pages.

*Primary Examiner* — Angel T Brockman
(74) *Attorney, Agent, or Firm* — Cantor Colburn LLP

(57) ABSTRACT

A wireless communication system includes gateway, a server, and a wireless device. The server is configured to send a heartbeat of a plurality of heartbeats to the wireless device upon expiration of a respective heartbeat interval of a plurality of heartbeat intervals. The wireless device is configured to send a plurality of Power Save polls to the Access Point device, wherein each Power Save poll of the plurality of Power Save polls retrieves a respective heartbeat of the plurality of heartbeats.

13 Claims, 12 Drawing Sheets

(52) U.S. Cl.
CPC ... *H04W 52/0229* (2013.01); *H04W 52/0235* (2013.01); *H04W 88/16* (2013.01)

(58) Field of Classification Search
USPC .......................................................... 370/311
See application file for complete search history.

(56) References Cited

U.S. PATENT DOCUMENTS

| | | |
|---|---|---|
| 8,907,807 B2 | 12/2014 | Huang et al. |
| 9,154,312 B2 | 10/2015 | Katar et al. |
| 9,253,720 B2 | 2/2016 | Navda et al. |
| 9,338,741 B2 | 5/2016 | Xie et al. |
| 9,439,197 B1 | 9/2016 | Ngo et al. |
| 9,477,936 B2 | 10/2016 | Lawson et al. |
| 2013/0170417 A1 | 7/2013 | Thomas et al. |
| 2013/0212413 A1 | 8/2013 | Berndt et al. |
| 2013/0317659 A1 | 11/2013 | Thomas et al. |
| 2013/0346494 A1 | 12/2013 | Nakfour et al. |
| 2014/0241259 A1 | 8/2014 | Wu et al. |
| 2015/0012763 A1 | 1/2015 | Cohen et al. |
| 2015/0121100 A1 | 4/2015 | Peng et al. |
| 2015/0271255 A1 | 9/2015 | Mackay et al. |
| 2016/0119354 A1 | 4/2016 | Logue et al. |
| 2016/0143085 A1 | 5/2016 | Cai et al. |
| 2016/0241702 A1 | 8/2016 | Chandra et al. |
| 2017/0075343 A1 | 3/2017 | Hansen et al. |

FOREIGN PATENT DOCUMENTS

| | | |
|---|---|---|
| GB | 2415573 B | 1/2007 |
| WO | 2012068526 A1 | 5/2012 |
| WO | 2016085038 A1 | 6/2016 |
| WO | 2016191605 A1 | 12/2016 |

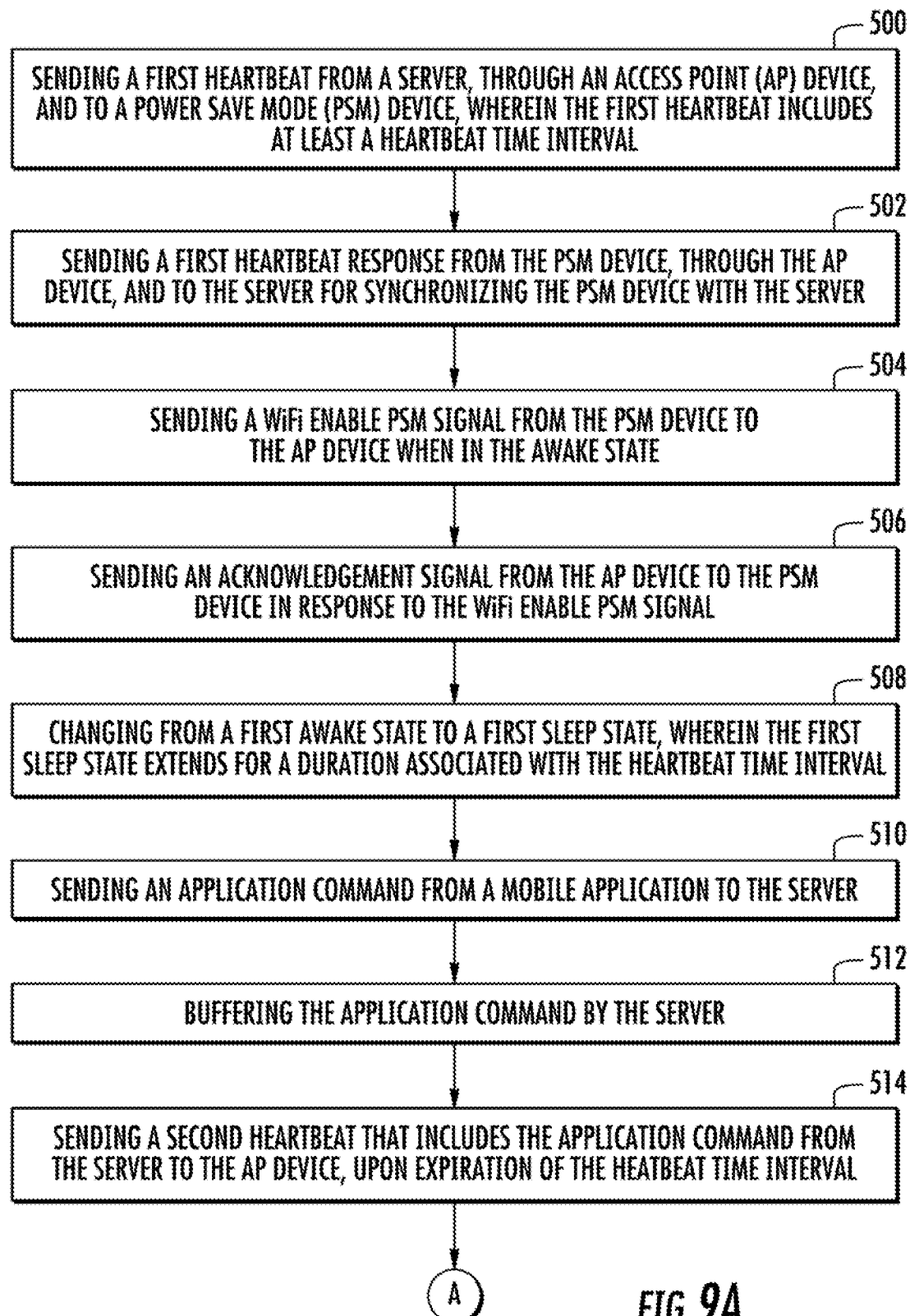

WIRELESS COMMUNICATION SYSTEM AND METHOD OF MANAGING ENERGY CONSUMPTION OF A WIRELESS DEVICE

CROSS-REFERENCE TO RELATED APPLICATIONS

This is a National Stage Application of PCT/US2018/020435 filed Mar. 1, 2018, which claims priority to U.S. Provisional Application No. 62/466,175 filed Mar. 2, 2017, both of which are incorporated herein by reference in their entirety.

BACKGROUND

The present disclosure relates to a communication system and, more particularly, to a wireless communication system and method of reducing energy consumption of wireless devices of the system.

Wireless communication systems may include a wireless device, such as an Internet of Things (IoT) device that may be smart and is powered by batteries. Such wireless devices may operate in different energy modes, such as sleep and awake modes to, at least in part, preserve battery life. The wakeup frequency and duration of the wireless device in the different energy modes may not always be optimal in terms of preserving battery life, and may be dependent upon other parameters and/or characteristics of the communication system.

Wi-Fi Power Saving Mode (PSM) is one example of a communication technology utilized by battery powered IoT devices to establish and maintain a Wi-Fi link with an Access Point (AP) device. With Wi-Fi PSM, IoT devices may enter into a sleep state for a predetermined amount of time to save energy after providing notification to the AP device of the IoT device's change in state (i.e., from awake to sleep states). When notified, the AP device may start buffering packets for the sleeping IoT device. The IoT device must awake periodically to check beacons from the AP device that indicate if a buffered packet exists for the IoT device. If a buffered packet does exist, the IoT device retrieves the packet via a Power Save (PS) Poll message.

Unfortunately, IoT devices must awake frequently to monitor the beacons for buffered packages thus expending energy from IoT device batteries. Moreover, the duration that an AP device will buffer a packet (i.e., time before the AP device drops the packet) for an IoT device is limited and manufacturer dependent, thus may be different from one AP device to the next. Therefore, awake periods of the IoT device are typically, conservatively, extended to reduce any chance of a buffered packet being dropped. Yet further, communications with the cloud may introduce unknown latencies, leading to less than optimal system performance. System improvements that preserve the battery life of IoT devices, and/or manage idle time of AP devices are desirable.

SUMMARY

A method of operating a wireless communication system according to one, non-limiting, embodiment of the present disclosure includes sending a first heartbeat from a server, through a gateway, and to a wireless device, wherein the first heartbeat includes at least a heartbeat interval; sending a first heartbeat response from the wireless device, through the gateway, and to the server for synchronizing the wireless device with the server; and changing from a first awake state to a first sleep state, wherein the first sleep state extends for a duration associated with the heartbeat interval.

Additionally to the foregoing embodiment, the method includes sending a Wi-Fi Enable Power Save Mode (PSM) signal from the wireless device to the gateway when in the awake state, wherein the gateway is an Access Point (AP) device and the wireless device is a PSM device.

In the alternative or additionally thereto, in the foregoing embodiment, the server is part of a cloud.

In the alternative or additionally thereto, in the foregoing embodiment, the first heartbeat is buffered by the gateway and the wireless device is a PSM device.

In the alternative or additionally thereto, in the foregoing embodiment, the method includes broadcasting an acknowledgement signal from the gateway to the PSM device in response to the Wi-Fi Enable PSM signal, and when in the awake state.

In the alternative or additionally thereto, in the foregoing embodiment, the heartbeat interval is about equal to combined durations of the first awake state and the first sleep state.

In the alternative or additionally thereto, in the foregoing embodiment, the method includes sending an application command to the server; buffering the application command by the server; and sending a second heartbeat that includes the application command from the server to the wireless device, upon expiration of the time interval.

In the alternative or additionally thereto, in the foregoing embodiment, the method includes buffering the application command by the gateway; entering a second awake state from the first sleep state approximately upon expiration of the heartbeat time interval; sending a Power Save (PS) poll from the wireless device to the gateway; and broadcasting the second heartbeat from the gateway and to the wireless device.

In the alternative or additionally thereto, in the foregoing embodiment, the application command is sent to the server by a mobile application.

In the alternative or additionally thereto, in the foregoing embodiment, the method includes sending a second heartbeat response from the wireless device, through the gateway, through the server, and to the mobile application; and entering a second sleep state from the second awake state.

In the alternative or additionally thereto, in the foregoing embodiment, the wireless device is configured to ignore any beacons broadcasted by the gateway.

A wireless communication system according to another, non-limiting, embodiment includes a gateway; a server configured to send a heartbeat of a plurality of heartbeats to the gateway upon expiration of a respective heartbeat interval of a plurality of heartbeat intervals; and a wireless device configured to retrieve a heartbeat of the plurality of heartbeats.

Additionally to the foregoing embodiment, the wireless device is a Power Save Mode (PSM) device configured to send a plurality of PS polls to the gateway, wherein each PS poll of the plurality of PS polls retrieves a respective heartbeat of the plurality of heartbeats.

In the alternative or additionally thereto, in the foregoing embodiment, each heartbeat interval of the plurality of heartbeat intervals equals the combined duration of an awake state and a sleep state.

In the alternative or additionally thereto, in the foregoing embodiment, the method includes a mobile application configured to send a mobile command to the server, wherein the server is configured to buffer the mobile command until the next heartbeat of the plurality of heartbeats is sent to the wireless device and buffered by the gateway, whereupon the mobile command becomes part of the next heartbeat.

In the alternative or additionally thereto, in the foregoing embodiment, the server is part of a cloud.

In the alternative or additionally thereto, in the foregoing embodiment, each PS poll of the plurality of PS polls is sent to the gateway approximately upon expiration of a respective heartbeat time duration of the plurality of heartbeat time durations.

In the alternative or additionally thereto, in the foregoing embodiment, the gateway is an Access Point (AP) device.

The foregoing features and elements may be combined in various combinations without exclusivity, unless expressly indicated otherwise. These features and elements as well as the operation thereof will become more apparent in light of the following description and the accompanying drawings. However, it should be understood that the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows:

FIGS. 9A and 9B represent a flow chart illustrating a method of operating the "server initiated, non-beacon-tracking, wireless, communication system."

DETAILED DESCRIPTION

Figure 1:
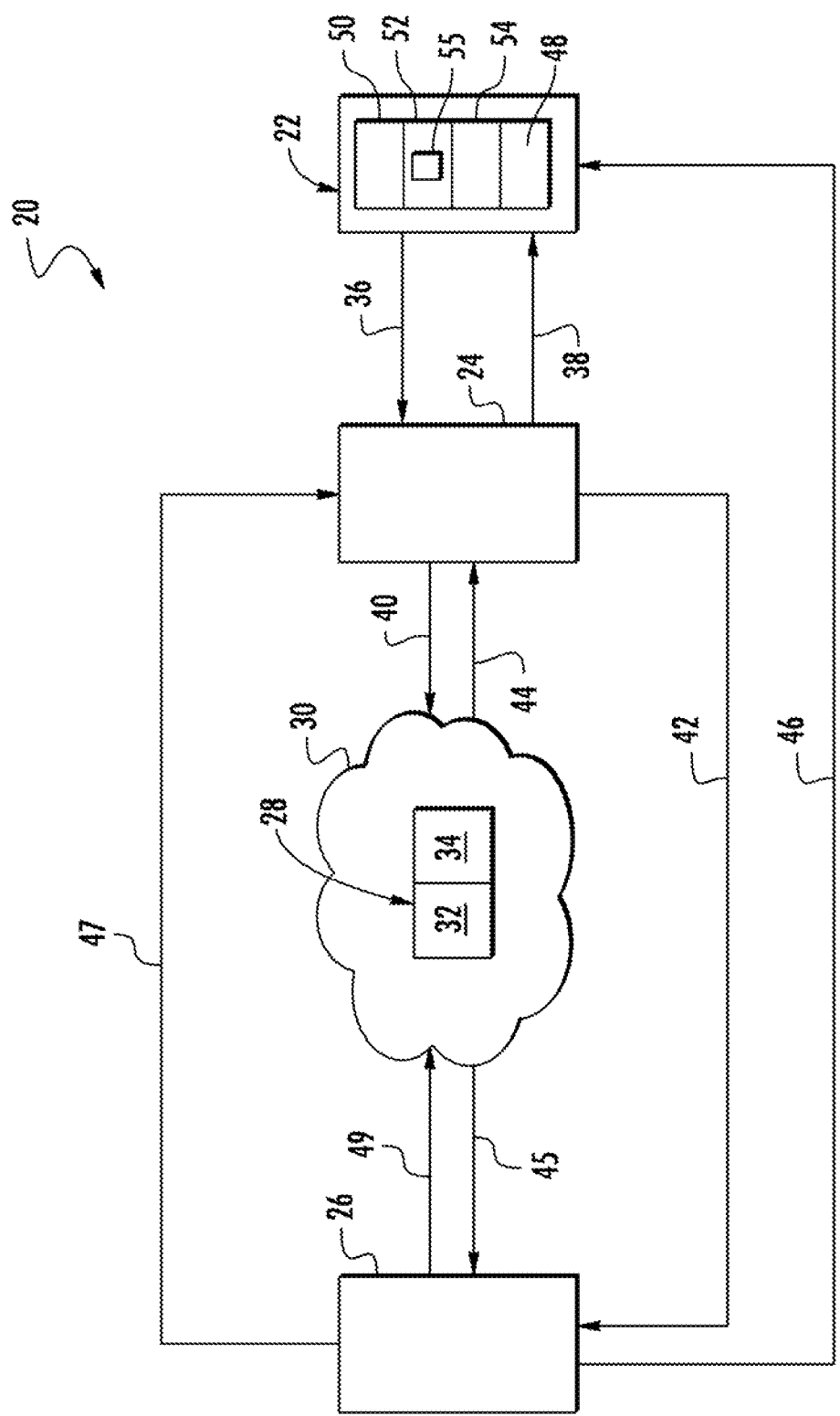
FIG. 1 is a schematic of a wireless communication system as one, non-limiting, exemplary embodiment of the present disclosure.

Referring to FIG. 1, an exemplary embodiment of a wireless communication system 20 is illustrated. The wireless communication system 20 may include a wireless device 22, a gateway 24 (e.g., an Access Point (AP) device indicative of Wi-Fi), an application 26 that may be a user application, and a controller 28 that may be, or is part of, a cloud 30. The controller 28 may be a server that includes a computing processor 32 and a storage medium 34 that may be computer writeable and readable. The wireless device 22 may be configured to communicate with the AP device 24 over a wireless pathway (see arrow 36). The AP device 24 may be configured to communicate with the wireless device 22, the controller 28, and/or the application 26 over respective pathways (see arrows 38, 40, 42) that may be wireless pathways. The cloud 30, and/or controller 28, may be configured to communicate with the AP device 24 over a pathway (see arrow 44) that may be wireless, and the application 26 over a pathway (see arrow 45) that may be wireless. The application 26 may be configured to communicate with the wireless device 22 over a pathway 46 that may be wireless, communicate with the AP device 24 over a wireless pathway (see arrow 47), and/or communicate with the controller 28 over a pathway (see arrow 49) that may be wireless. In one example, the mobile application 26 may directly connect to the cloud 30 via a third generation of mobile telecommunications technology (i.e., 3G), or indirectly through the AP device 24 (i.e., Home Wi-Fi). In some embodiments, the application 26, as a user application, may be a mobile application. In other embodiments, the application 26 may be another wireless device such as a Wi-Fi PSM device, and/or the wireless device may include the application 26. It is understood that the term "gateway" is treated broadly and is indicative of more than just Wi-Fi communications. For example, the gateway may support ZWave.

The AP device 24 may be a router having firmware that supports Wi-Fi Power Save Mode (PSM). The mobile application 26 may be a smart phone, a digital media player, a tablet computer, and other applications. Examples of a wireless device 22 may include smart home sensors or intrusion sensors of a security system configured to detect the opening of windows or doors, Passive Infrared (PR) sensors, image sensors (i.e., PIR sensor with camera), thermal sensors of a heating system configured to measure the temperature of ambient air, gas sensors configured to detect the presence of gases, smoke detectors as part of a safety system, and many other types of devices utilizing batteries and communicating wirelessly.

The wireless device 22 may further be a smart device, an Internet of Things (IoT) device, and/or a Wi-Fi PSM device configured to communicate with the cloud 30 through the AP device 24. The wireless device 22 may include a power management module 48 (i.e., battery and a means of managing battery power), a sensor and/or actuator 50, a computing processor 52 (e.g., microcontroller), and a wireless transceiver 54. As a PSM device, the wireless device 22 is configured to enter into sleep and awake states at a predetermined frequency and duration of time.

In one embodiment and when in a sleep state, internal timer(s) or counter(s) 55 of the processor 52 of the wireless device 22 may remain powered, but all other components of the wireless device 22 are generally turned off. The wireless device 22 may awake from the sleep state when a pre-specified awake time occurs, or when an enabled interrupt is triggered (i.e., an event sensed by the sensor 50 occurs). Generally, maximizing the sleep state durations and/or reducing or eliminating the need to track AP beacons, optimizes battery life. In one example, the preferred life for a battery of a low power IoT device is about four to five years.

The wireless communication system 20 eliminates the need for more traditional tracking of beacons broadcasted by the AP device 24 at the wireless device 22, and thereby may maximize the standby time (i.e., sleep state duration) of the wireless device 22. Beacons do not need to be tracked fir receiving a buffered packet from the AP device 24, since a Power Save (PS) poll (i.e., PS poll signal) may be sent straight away from the wireless device 22 to the AP device 24. The AP device 24 may reply to the PS poll with an Acknowledgement (ACK), (i.e., acknowledgement signal)

followed by a buffered packet if a signal or data has been buffered by the AP device 24 for retrieval by the wireless device 22, or directly with the buffered packets. If there is no packet buffered, the response is a no-data packet, or the ACK followed by the no-data packet. In the event that a no-data packet is received by the wireless device 22, the wireless device 22 may return to a sleep state. If no packet is received by the wireless device 22, the wireless device may return to a sleep state after a pre-specified duration of the awake state has expired (i.e., timed-out). After another pre-specified duration in a sleep state, the wireless device 22 will wake up again and send a PS poll to retrieve the buffered packet as previously described. The process will repeat until a data packet is received, or a pre-specified counter reaches its limit.

PSM Device Initiated, Non-Beacon-Tracking, Wireless, Communication System

Figure 2:
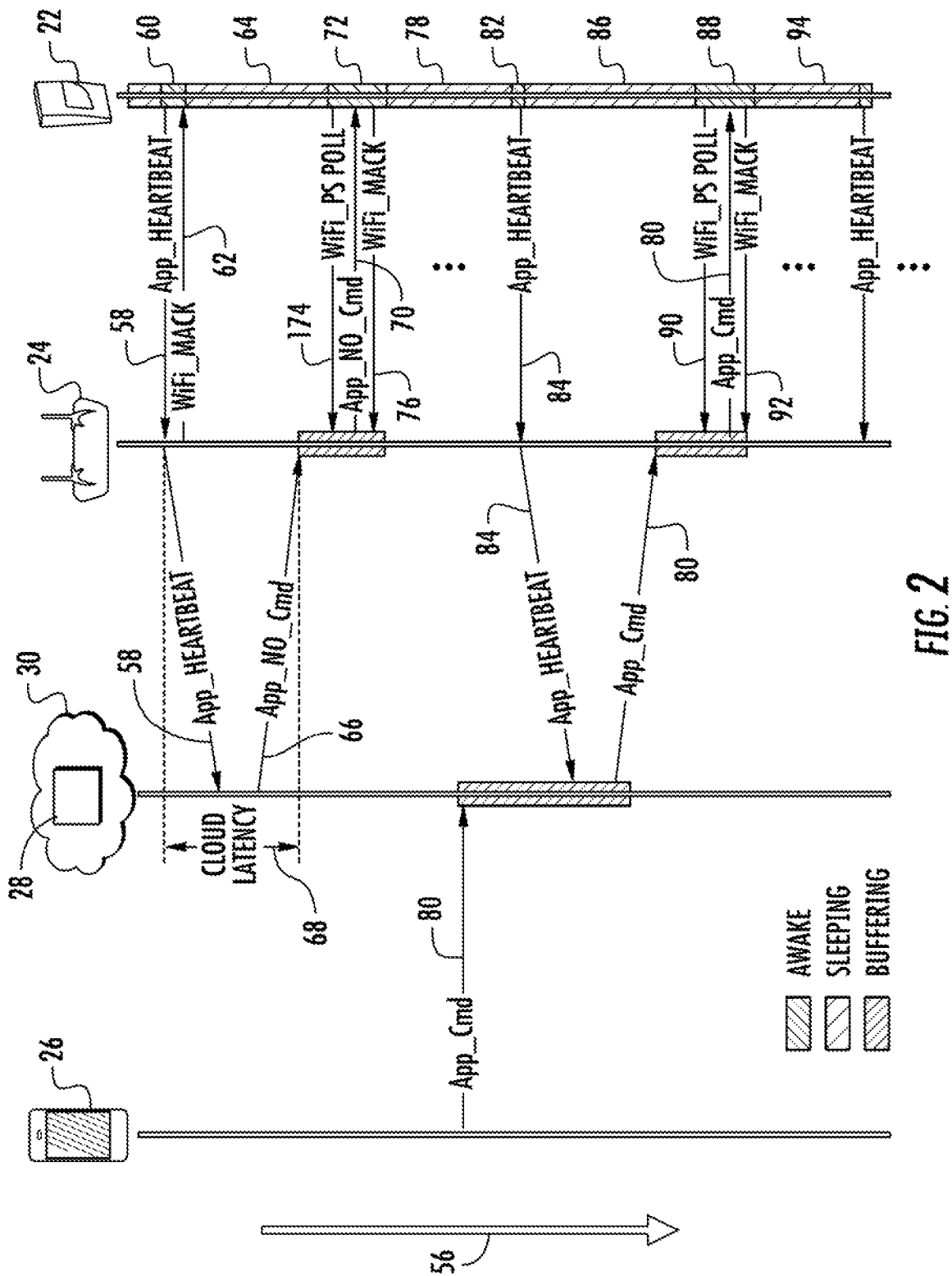
FIG. 2 is a schematic of a "PSM device initiated, non-beacon-tracking, wireless, communication system" as one embodiment of the wireless communication system, and that illustrates a method of retrieving buffered packets.

Referring to FIG. 2, a schematic generally outlining communications between the wireless device 22, the AP device 24, the server 28 (i.e., and/or cloud 30), and the mobile application 26 along a timeline (see arrow 56) is illustrated. This particular string of communications generally depicts a process wherein the wireless device 22 initiates Wi-Fi PSM without requiring the wireless device 22 to track beacons sent by the AP device 24. That is, the wireless device 22 is configured to ignore the beacons broadcasted by the AP device 24.

More specifically, the wireless device 22 of the communication system 20 may send a first request 58 (i.e., heartbeat or request signal) through the AP device 24 and to the server 28 when in a first awake state 60 (i.e., the PSM). Upon receiving the first request 58, the AP device 24 may send an acknowledgement (ACK) 62 to the wireless device 22. The ACK 62 may be a Wi-Fi ACK at a MAC level. After receiving the ACK 62, the wireless device 22 may enter into a minor sleep state 64. The minor sleep state 64 has a conservative duration that is longer than an uplink latency (see arrow 68), but may be shorter than the summation of the uplink latency 68 plus a buffer timeout duration. In one embodiment, the minor sleep state 64 duration may be shorter than the buffer timeout duration.

In one embodiment, and generally while the wireless device 22 is in the minor sleep state 64, the server 28 may receive the first request 58 from the AP device 24 and, send a first response 66 to the AP device 24. In general, the uplink latency 68 may be measured from the time that the AP device 24 receives the first request 58 to the time that the AP device 24 receives the first response 66. It is understood that the first response 66 may not contain any command language, or command data, and may instead be an empty packet, a registration request, information on status, and/or other related responses. In one embodiment, the uplink latency 68 may be less than the duration of the summation of the first awake state 60 plus the duration of the minor sleep state 64.

The first response 66 may be buffered by the AP device 24, and thus awaits retrieval by the wireless device 22 as a data packet 70 (i.e., buffered packet). Because the minor sleep state 64 duration is generally less than the summation of the uplink latency 68 and the AP buffer timeout duration, the data packet 70 will not be dropped by the AP device 24. Unlike other data packets to be described below, data packet 70 may not contain a command from the mobile device 26, and instead may contain information such as registration information, status information, and the like.

From the minor sleep state 64, the wireless device 22 may enter into a second awake state 72. When in the second awake state 72, the wireless device 22 may send a first Power Save (PS) poll 74 to the AP device 24. In response to the first PS poll 74, the AP device 24 may send the buffered data packet 70 to the wireless device 22. After receiving the data packet 70, the wireless device 22 may send an ACK 76 to the AP device 24, and then enter into a major sleep state 78.

The major sleep state 78 duration may be as long as reasonably possible, but shorter than an idle time of the AP device 24 to prevent disassociation of the AP device 24 from the wireless device 22. The duration of the major sleep state 78 is considerably longer than the duration of the minor sleep state 64, and thus facilitates a reduction in energy consumption of the wireless device 22. In one embodiment, the duration of the minor sleep state 64 may be about one (1) second, and the duration of the major sleep state 78 may be about fifty (50) seconds. Moreover, the major sleep state 78 may be more energy efficient than the minor sleep state 64 because in the minor sleep state 64 only the transceiver 54 and some addition hardware may be switched off. In the major sleep state 78, the transceiver 54, various hardware, the processor 52 (e.g., CPU), and some voltage regulators may be switched off. That is, for the major sleep state 78, only the real time counter 55 or oscillator may remain on to trigger an interrupt on the processor to awake the processor.

In one embodiment, receipt of the first data packet 70 enables the wireless device 22 to determine if further actions need to be performed, for example, a command to take a picture. More specifically, the data packet 70 may contain a command that requires processing by the wireless device 22, and execution of the command that may entail sending a command response (not shown), from the wireless device, through the AP device 24, and to the server 28. It is further understood that the ACK 76 (i.e., or the ACK part of the data packet 70) functions to indicate if there are multiple packets to be retrieved. If there are multiple packets, multiple PS polls would be sent until all of the buffered packets are retrieved.

It is contemplated and understood that prior to receipt and buffering of the data packet 70 by the AP device 24, and thus prior to the second awake state 72, the wireless device 22 may awake and send at least one PS poll (not shown in FIG. 2) that is acknowledged by the AP device 24, and wherein the AP device 24 then sends a no-data packet (not shown) to the wireless device 24. The no-data packet is originated by the AP device 24 as a result of the associated PS poll and not having any buffered packet for the wireless device 22, and is therefore not buffered by the AP device. Upon receipt of the no-data packet by the wireless device 22, the wireless device may return to a sleep state until the next PS poll.

The server 28 may be configured to receive command signals 80 (e.g., command request) from the mobile application 26. In one example, the command signal 80 may be associated with a learned buffer timeout duration to be discussed further below. Once received, the server 28 may buffer the command signal 80, while awaiting retrieval by the wireless device 22 through the AP device 24. Generally, it is understood that the buffer timeout duration of a cloud server may be substantially longer than the buffer timeout duration of the AP device 24 which may be manufacturer dependent.

While the command signal 80 is buffered by the server 28, the wireless device 22 may enter into a third awake state 82 from the major sleep state 78. While in the third awake state 82, the wireless device 22 may send a second request 84 (i.e., retrieval request), through the AP device 24, and to the server 28. After sending the second request 84, the wireless device 22 may enter into a second minor sleep state 86. The second request 84 may generally be an inquiry for data or commands from the cloud. In the present example, the second request 84 enacts retrieval of the command signal 80 from the server 28 for buffering at the AP device 24. That is, in response to the second request 84, the server 28 forwards the command signal 80 to the AP device 24, where the command signal 80 is, again, buffered as a data, or command, packet.

While the command signal 80 may be buffered by the AP device 24, the wireless device 22 may enter into a fourth awake state 88 from the second minor sleep state 86. While in the fourth awake state 88, the wireless device 22 may send a second PS poll 90 to the AP device 24. In response to the second PS poll 90, the AP device 24 may send the data packet associated with the command signal 80 to the wireless device 22. Upon receipt of the data packet, the wireless device 22 may send an ACK 92 to the AP device 24, may perform an action in accordance with the data packet, and may then enter into a second major sleep state 94. It is understood that the process of retrieving data packets from the cloud 30 via cloud requests and AP polling of the AP device 24 may generally repeat itself during normal operation. Such requests and polling may eliminate any need for more traditional tracking of beacons, thus enhancing operation of the power management module 48 and preserving battery life.

Advantages and benefits of the non-beacon-tracking, wireless, communication system 20 includes a reduction in the energy consumption of wireless devices 22 by avoiding the need to track AP beacons by the wireless device 22, and maximizing the time the wireless device 22 may stay in a sleep mode without losing packets at the AP device 24. The method of operating the system 20 may be applied to legacy AP devices, and may be more efficient than legacy Wi-Fi PSM protocol when the wireless device 22 is certain that the AP device 24 is buffering a packet for the wireless device. This may be true for wireless devices that stay in a sleep state for most of the time, since periodic heartbeats may be exchanged between the cloud 30 and the devices. The following method may assist the wireless device 22 in optimizing the minor sleep state duration according to buffer capability of the AP device 24, which may make the device more energy efficient when requesting data from the cloud server(s) 28 since the cloud latencies have a lower or null impact on it.

Measuring Buffer Timeout Duration

The buffer timeout duration of the AP device 22 is generally a manufacturer trait or parameter of the device itself, and may not be typically known by the end user. The buffer timeout duration is generally that duration (i.e., interval of time) that the AP device 24 will hold onto a packet awaiting retrieval by the wireless device 22. If the wireless device 22 does not retrieve the packet before expiration of the buffer timeout duration, the AP device 24 will drop the packet. Once the packet is dropped, the packet is not retrievable by the wireless device 22.

Figure 3:
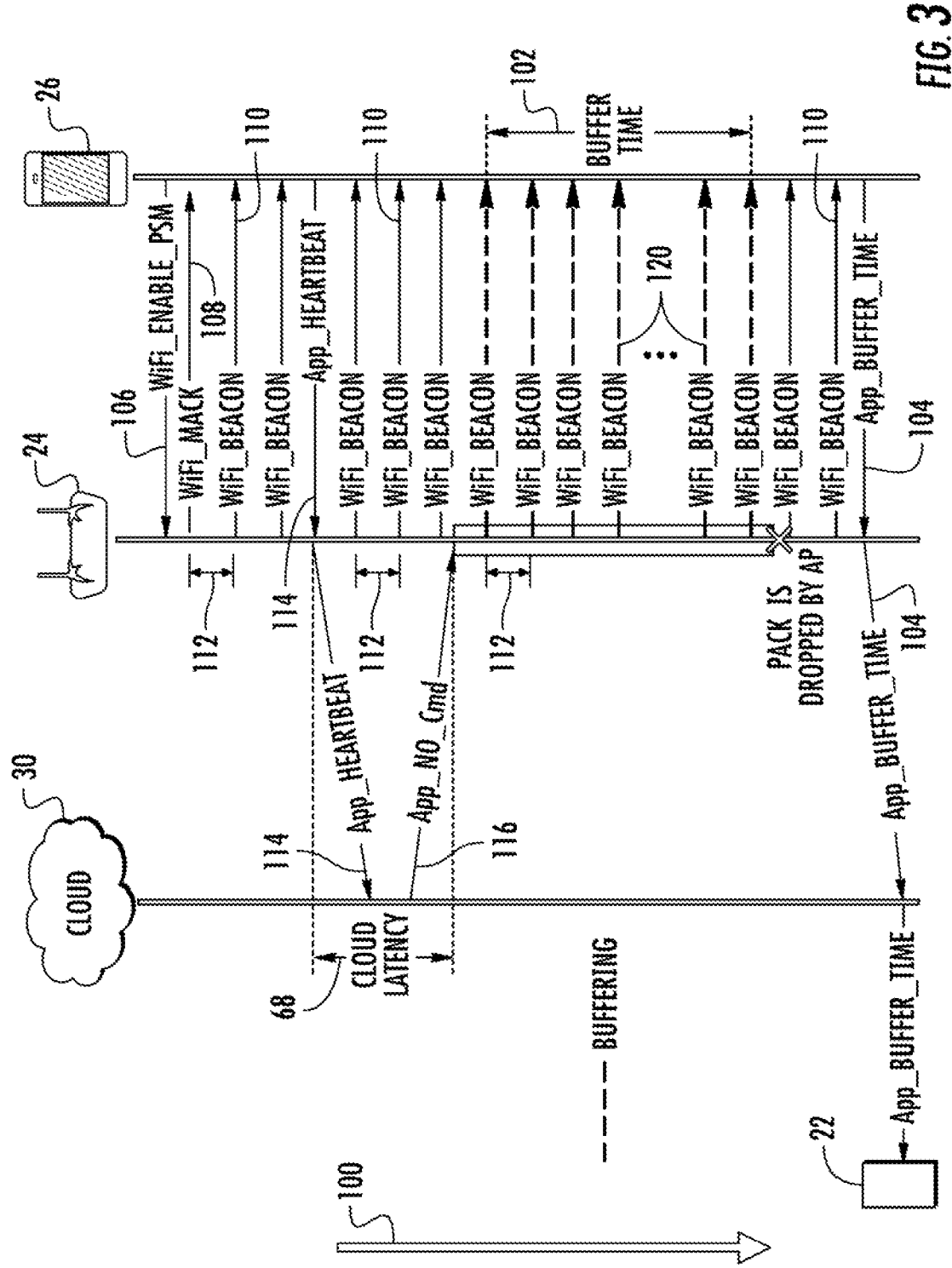
FIG. 3 is a schematic of a method of learning a buffer timeout duration of an Access Point (AP) device of the wireless communication system.

Referring to FIG. 3, a schematic generally outlining communications between the wireless device 22, the AP device 24, the cloud 30, and the mobile application 26 along a timeline (see arrow 100) is illustrated. This particular string of communications generally depicts a learning process wherein a buffer timeout duration (see arrow 102) of the AP device 24 is determined. That is, the wireless communication system 20 may be configured to measure at least a duration 102 of a buffer timeout that generally represents the maximum amount of time that the AP device 24 will hold a package before dropping the package (i.e., deleting the package). Once learned, a signal (see arrow 104) associated with the buffer timeout duration 102 may be sent from the mobile application 26, through the cloud 30, and to the wireless device 22 to facilitate maximizing the sleep state.

Figure 4:
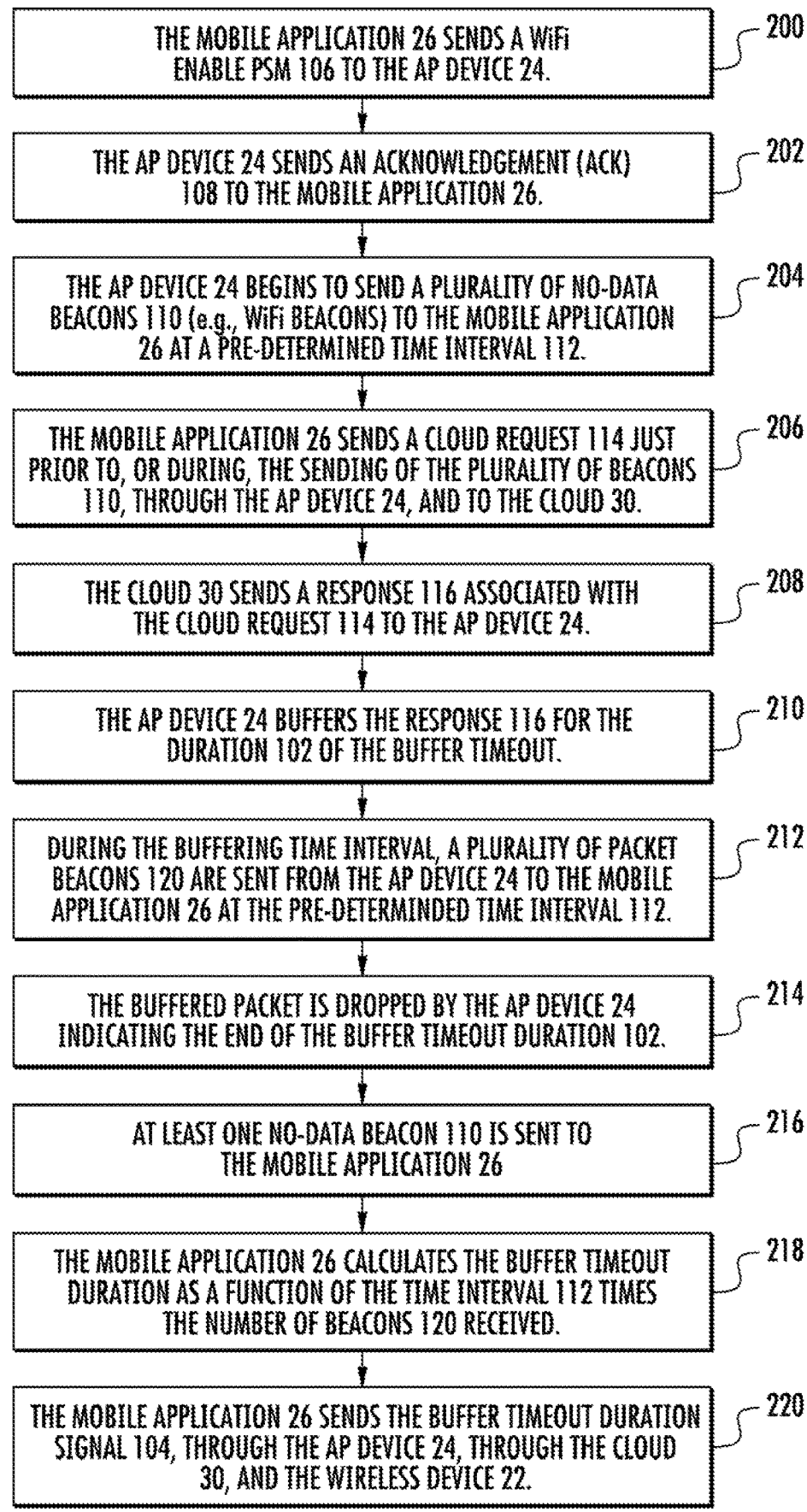
FIG. 4 is a flowchart of the method illustrated in FIG. 3.

Referring to FIGS. 3 and 4, the method may begin with block 200 wherein the mobile application 26 sends a Wi-Fi Enable PSM 106 (i.e., signal) to the AP device 24. At block 202, the AP device 24 sends an acknowledgement (ACK) 108 to the mobile application 26 indicating to the mobile application 26 that the Wi-Fi enable PSM 106 was received. In one embodiment, the ACK 108 may be a Wi-Fi MAC ACK. At block 204, the AP device 24 may begin to broadcast periodic beacons 110 (e.g., Wi-Fi beacons) at a pre-determined time interval (see arrows 112) that are received by the mobile application 26. The information bits contained in the beacons 110 may indicate the lack of a buffered packet at the AP device 24 for the mobile application 26. In one example, the time interval may be about one-hundred milliseconds (100 ms).

At block 206, the mobile application sends a heartbeat 114 (i.e., cloud request) just prior to, or during, the sending of the plurality of beacons 110, through the AP device 24 and to the cloud 30. At block 208, the cloud 30 sends a response 116 associated with the cloud request 114 to the AP device 24. A server or cloud latency duration (see arrow 118) may be determined and may be measured from the time the AP device 24 sends the request 114 to the cloud 30 and the time that the AP device 24 receives the response 116.

At block 210, the AP device 24 buffers the response 116 for the duration 102 of the buffer timeout. At block 212, during the buffering time interval, periodic beacons 120 are broadcasted from the AP device 24 at the pre-determined time interval 112 and received by the mobile application 26. The information bits in the beacons 120 are updated compared to the previous beacons 110 to indicate the presence of the buffered packets (i.e., associated with the response 116) at the AP device 24 for the mobile application 26. At block 214, the buffered packet is dropped by the AP device 24 indicating the end of the buffer timeout duration 102.

At block 216, at least one beacon 110 (i.e., indicative of no buffered package) is broadcasted by the AP device 24 and received by the mobile application 26. At block 218, the mobile application calculates the buffer time out duration at a function of the time interval 112 times the number of beacons 120 received. At block 220, the mobile application 26 sends the buffer timeout duration signal 104, through the AP device 24, through the cloud 30, and to the wireless device 22 for maximizing the sleep state to preserve battery energy. It is understood that to avoid dropping buffered packets, the duration of each sleep state is less than the summation of the uplink latency 68 (i.e., cloud latency duration) and the buffer timeout duration 102.

Advantages and benefits of learning the AP buffer timeout duration as described herein includes a method that is non-intrusive, and the facilitation of power save methods to maximize the wireless device sleep interval without dropping packets.

Measuring AP Idle Time

The AP idle time is another trait of the AP device 22 and may be configured by the end user. The AP idle time is generally that amount of time allotted before the AP device 24 disassociates the wireless device 22 from the network. More specifically, if the wireless device 22 remains silent (i.e., no heartbeats, no Wi-Fi Power Save (PS) polls, and/or no acknowledgements) for the duration of the AP idle time, the wireless device 22 may be disassociated from the AP device 24. In such an example, a re-association process may then be performed. Because the re-association process expends energy from the wireless device 22, avoidance of disassociation is desirable. Typically, the AP idle time is much longer than the buffer timeout duration. For example, an AP idle time may be about five (5) minutes, and a buffer timeout duration may be about one (1) to five (5) seconds.

Figure 5:
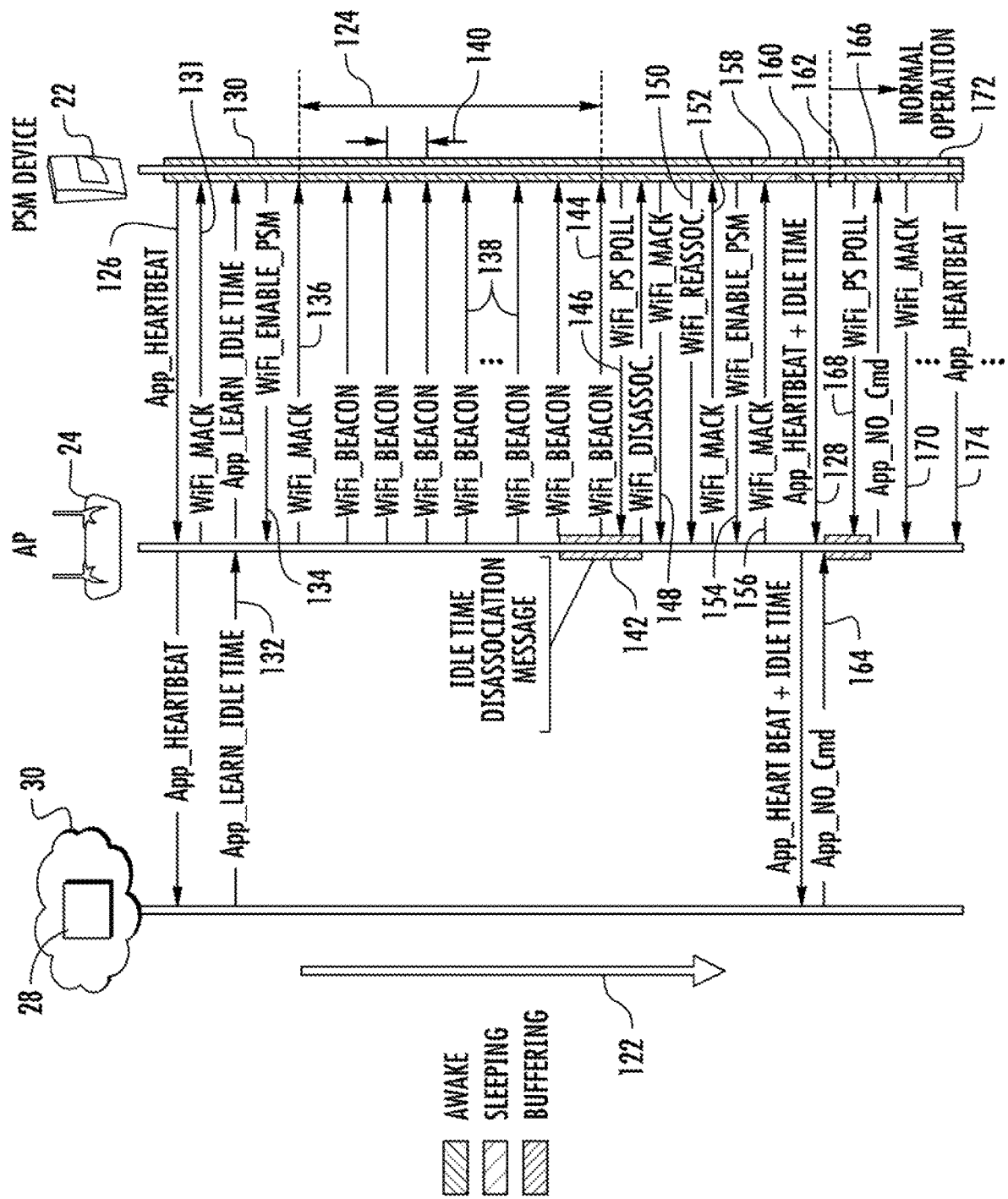
FIG. 5 is a schematic of a method of learning an idle time parameter of the AP device.

Referring to FIG. 5, a schematic generally outlining communications between the wireless device 22, the AP device 24, and the server 28 (e.g., cloud 30), along a timeline (see arrow 122) is illustrated. This particular string of communications generally depicts a learning process wherein the AP idle time (see arrow 124) of the AP device 24 is determined or measured. That is, the wireless communication system 20 may be configured to measure at least a duration of the AP idle time 124 that generally represents the period of time before the AP device 24 disassociates the wireless device 22 due to inactivity. Once the AP idle time 124 is known, the time interval between heartbeats 128, 170 initiated by the wireless device 22 may be maximized, but not so long that disassociation occurs. In one example, the AP idle time 124 may be about four hundred (400) seconds. It is contemplated and understood that the wireless device 22 may not be a PSM device, or may not be operating in a PSM when the AP idle time is being learned/calculated.

It is further understood that the wireless device 22 may not initiate the AP idle time learning process, instead, the idle time learn command may be sent without a preceding heartbeat from the wireless device 22. That is, the command may initiate from the cloud 30, and through the AP device 24, or the command may initiate from the mobile application 26 (i.e., the method is executed by the mobile application 26 and the command is input directly by the user through a screen of the user application).

Figure 6A:
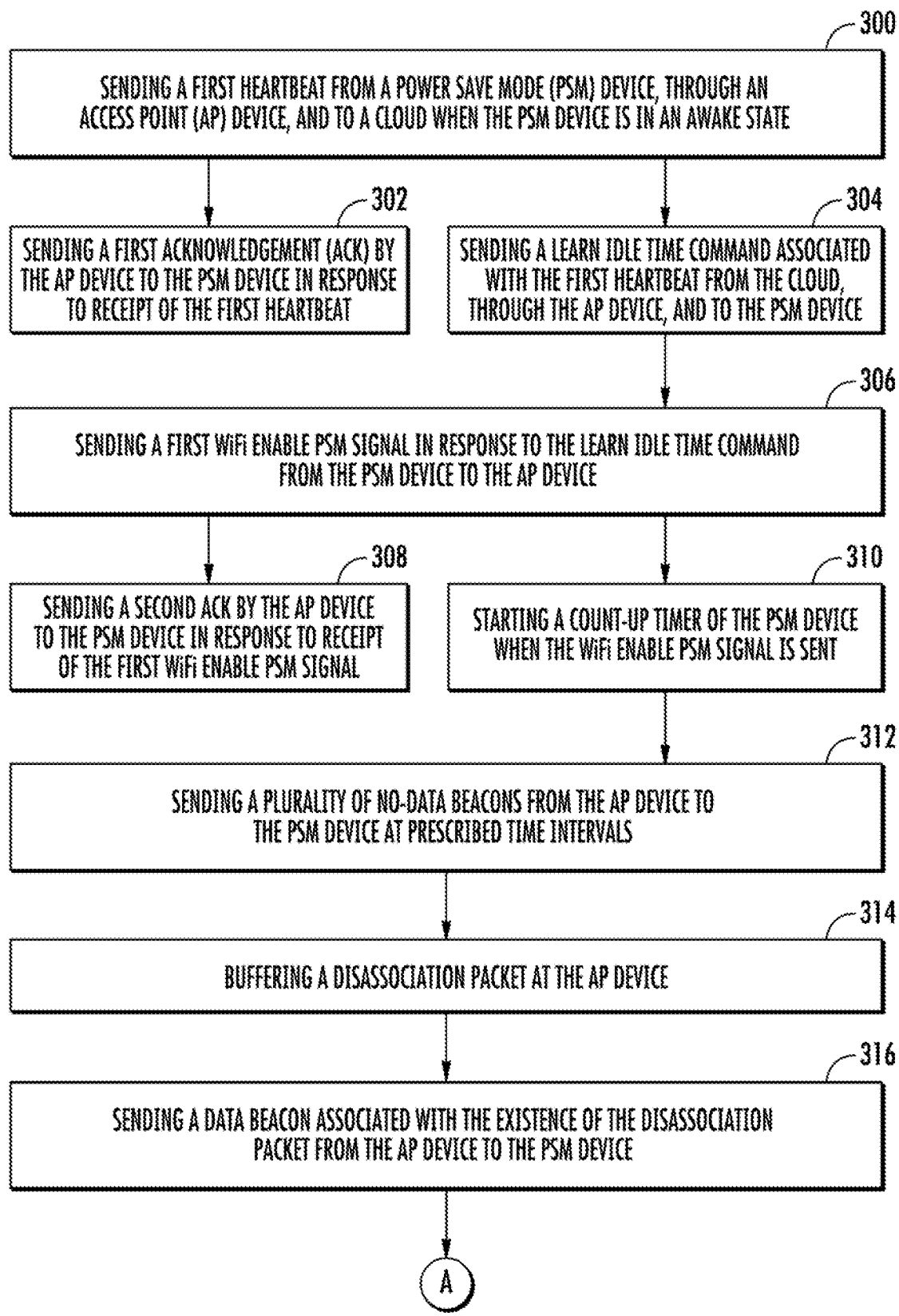
FIGS. 6A, 6B, and 6C represent a flowchart of the method illustrated in FIG. 5.
Figure 6B:
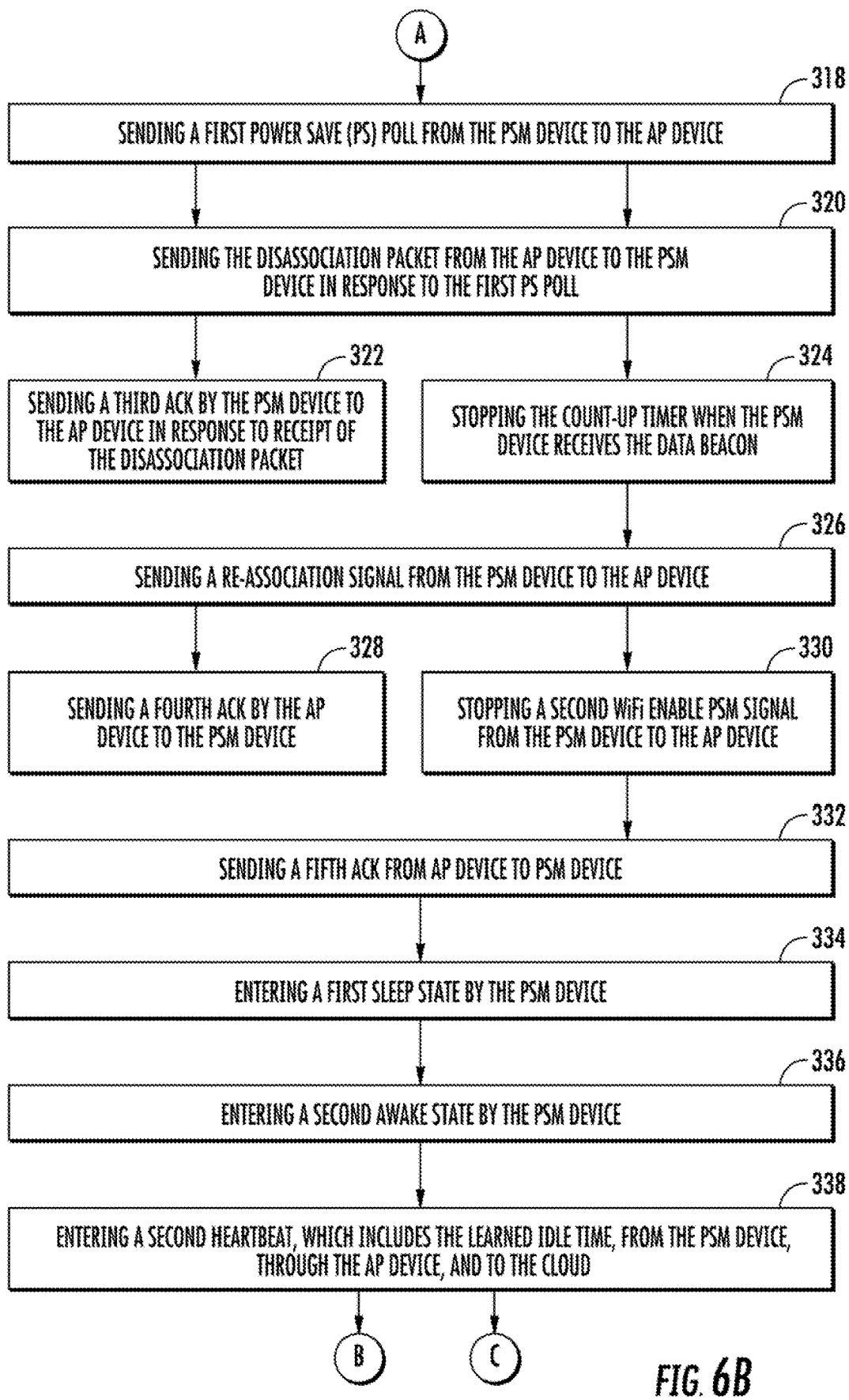
Figure 6C:
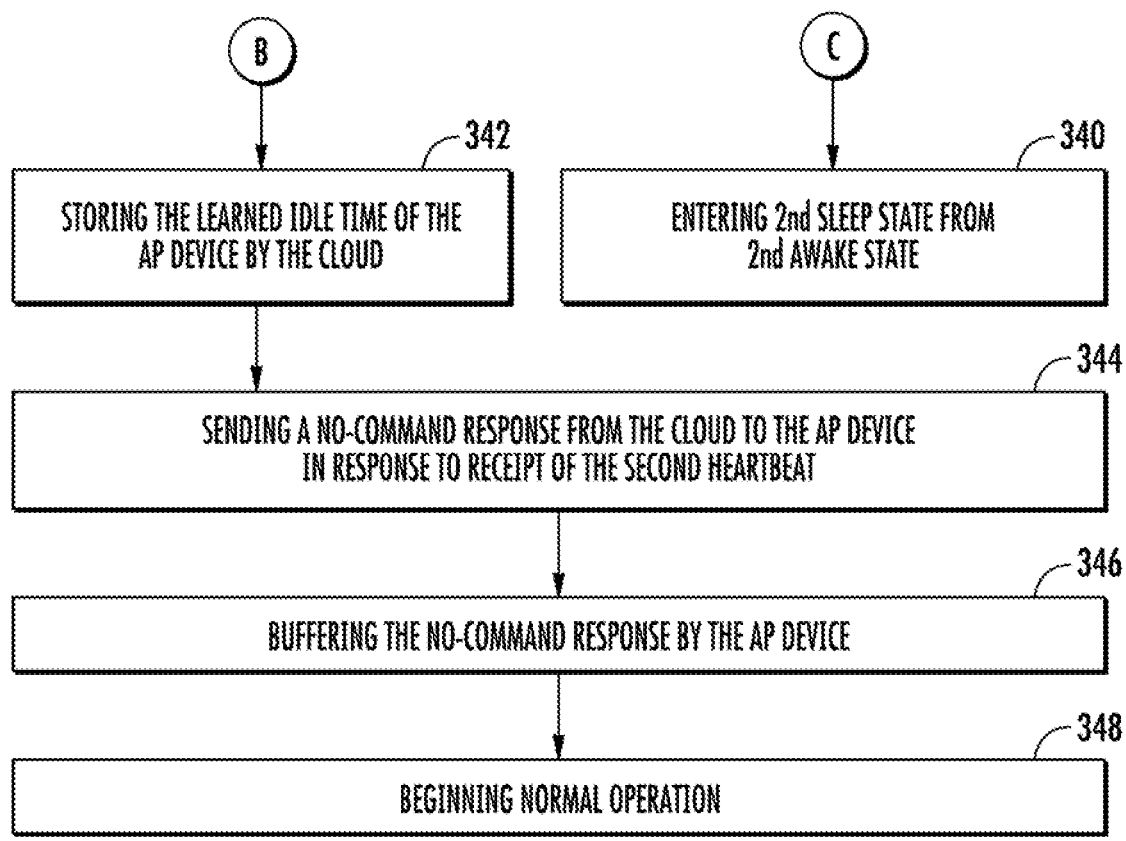

Referring to FIGS. 5 and 6, one example of a method of learning the AP idle time 124 (i.e., idle timeout) of the AP device 24 is generally illustrated. Once learned, the AP idle time 124 may be applied as part of a PSM strategy that avoids disassociation while applying any number of other strategies and learning processes that take into account at least one of the buffer timeout duration and uplink latency 68, and to enhance communication efficiency (e.g., preserve battery life of the wireless device 22).

In one embodiment of a method, and at block 300 (see FIG. 6), the heartbeat 126 is sent from the wireless device 22, through the AP device 24, and to the server 28 when the wireless device 22 is in an awake state 130. At block 302 and while the wireless device remains in the awake state 130, the AP device 24 may send an ACK 131 to the wireless device 22 in response to receipt of the heartbeat 26. At block 304 and as a result of receiving the heartbeat 126, the server 28 may send a learn idle time command 132 through the AP device 24, and to the wireless device 22. As part of this learn idle time command 132, a default value of about five (5) minutes may be assigned as the AP idle time.

It is contemplated and understood that the wireless device 22 as described and illustrated in FIG. 5, is operating in a PSM during the awake state 130. However, in another embodiment, the wireless device 22 may not be operating in the PSM during the awake state 130. Similarly, and as illustrated in FIG. 5, the AP device 24 may disassociate from the PSM device 22 as part of the idle time learning process. Alternatively, disassociation between devices 22, 24 may not occur. Instead, the AP device may send a forewarning of disassociation, and with a proper response from the PSM device 22, actual disassociation may be prevented. It is further understood that the awake state 130 is a dedicated state used to generally perform the measurement task of learning the AP idle time. That is, during this time, the wireless device 22 is generally inactive and may not send out messages.

At block 306 and while the wireless device remains in the awake state 130, the wireless device 22 may send a Wi-Fi Enable PSM signal 134 in response to the learn idle time command 132 to the AP device 24. At block 308 and while the wireless device 22 remains in the awake state 130, the AP device 24 may send an ACK 136 to the wireless device 22 in response to receipt of the Wi-Fi Enable PSM signal 134. At block 310, the counter 55 (see FIG. 1) of the wireless device 22 may be started when the Wi-Fi Enable PSM signal 134 is sent. At block 312, the AP device may begin to broadcast a plurality of no-data beacons 138 to the wireless device 22 at prescribed time intervals (see arrow 140) and while the wireless device 22 remains in the awake state 130 tracking those beacons.

At block 314, the AP device 24 may buffer an inactivity message 142 that may be a disassociation message (i.e., packet). At block 316, the AP device 24 broadcasts a data beacon 144 to the wireless device 22 while the wireless device is in the awake state 130. At block 318 and in response to the data beacon 144, the wireless device 22 sends a PS poll 146 to the AP device 24 to retrieve the inactivity message 142. At block 320, the AP device 24 sends the inactivity message 142 to the wireless device 22 in response to the PS poll 146. At block 322, the wireless device 22 may send an ACK 148 to the AP device 24 in response to receipt of the inactivity message 142. It is understood and contemplated that if the wireless device 22 is not in the PSM, the inactivity message 142 may not be buffered, and instead, may be sent directly to the wireless device 22.

At block 324, the counter 55 may be stopped when the wireless device 22 receives the data beacon 144, thereby facilitating measurement of the AP idle time 124. It is contemplated and understood that the AP idle time 124 may be measured by the start and stop points of the counter itself. That is, the counter 55 may be a count-up timer. Alternatively, the counter 55 may function as an event counter capable of counting the number of no-data beacons 138 and multiplying this number by the prescribed time interval 140. At block 326, the wireless device 22 may send a re-association signal 150 to the AP device 24. At block 328, the AP device 24 may send an ACK 152 to the wireless device 22 in response to receipt of the re-association signal 150.

At block 330, the wireless device 22 may send a Wi-Fi Enable PSM signal 154 to the AP device 24. At block 332, the AP device 24 may send an ACK 156 to the wireless device 22 in response to receipt of the Wi-Fi Enable PSM signal 154. At block 334 and upon receipt of the ACK 156, the wireless device 22 may enter into a first sleep state 158 from the awake state 130. At block 336, the wireless device 22 enters a second awake state 160 from the first sleep state 158. At block 338 and during the second awake state 160, the wireless device 22 sends the second heartbeat 128 that contains data relative to the measured/learned AP idle time 124, through the AP device 24, and to the server 28. It is contemplated and understood that the sleep state 158 may not be needed, or may not occur. Instead, heartbeat 128 may be sent when the wireless device 22 is still in the awake state 130.

At block 340, the wireless device 22 enters a second sleep state 162 from the second awake state 160, and after the heartbeat 128 is sent. At block 342, the server stores the learned AP idle time 124 and associates the parameter to the specific AP device 24. Because the learned AP idle time 124 is stored by the server 28 (i.e., data table), the server 28 may forward the learned AP idle time to other wireless devices utilizing the same AP device 24. At block 344, the server 28 sends a response 164 that may be a no-command response to the AP device 24. The term "no-command" in this context means that the response 164 may not contain a command from the mobile device 26. At block 346, the response 164 may be buffered by the AP device 24. At block 348, the system 20 may generally depart from the learn AP idle time process and begin normal operation.

In the present example and referring further to FIG. 5, normal operation may entail first entering a third awake state 166 from the second sleep state 162 for the purpose of sending a PS poll 168 to the AP device 24 while the response 164 is being buffered by the AP device 24. Once polled, the AP device 24 sends the response 164 to the wireless device 22, and the wireless device 22 responds with an ACK 170 before returning to a sleep state 172. The wireless device 22 may then awake again to send yet another heartbeat 174 as part of a normal operation.

Advantages and benefits of learning the AP idle time as described herein includes a method that is non-intrusive, and the facilitation of power save methods to maximize the wireless device sleep interval without losing association and authentication with the AP. The present method is non-intrusive because if a user sends commands to the wireless device 22 while executing the discovery, the cloud 30 may stop the method or process, forward client commands, and re-start the idle time learning process at a later time.

Measuring Uplink Latency:

Typically, the uplink latency 68, which may be measured in milliseconds, is much shorter than the buffer timeout duration that may be measured in seconds. Moreover, the uplink latency 68 (see FIG. 2) may be dependent upon the speed of, for example, the server 28 in any given moment in time, and thus may change. Therefore, measurement of the uplink latency 68 may be an average over several periods measured. Traditionally, measuring uplink latency 68 was difficult and intrusive because battery life is consumed, and the period in which a cloud response was buffered in the AP device 24 was unknown.

Figure 7:
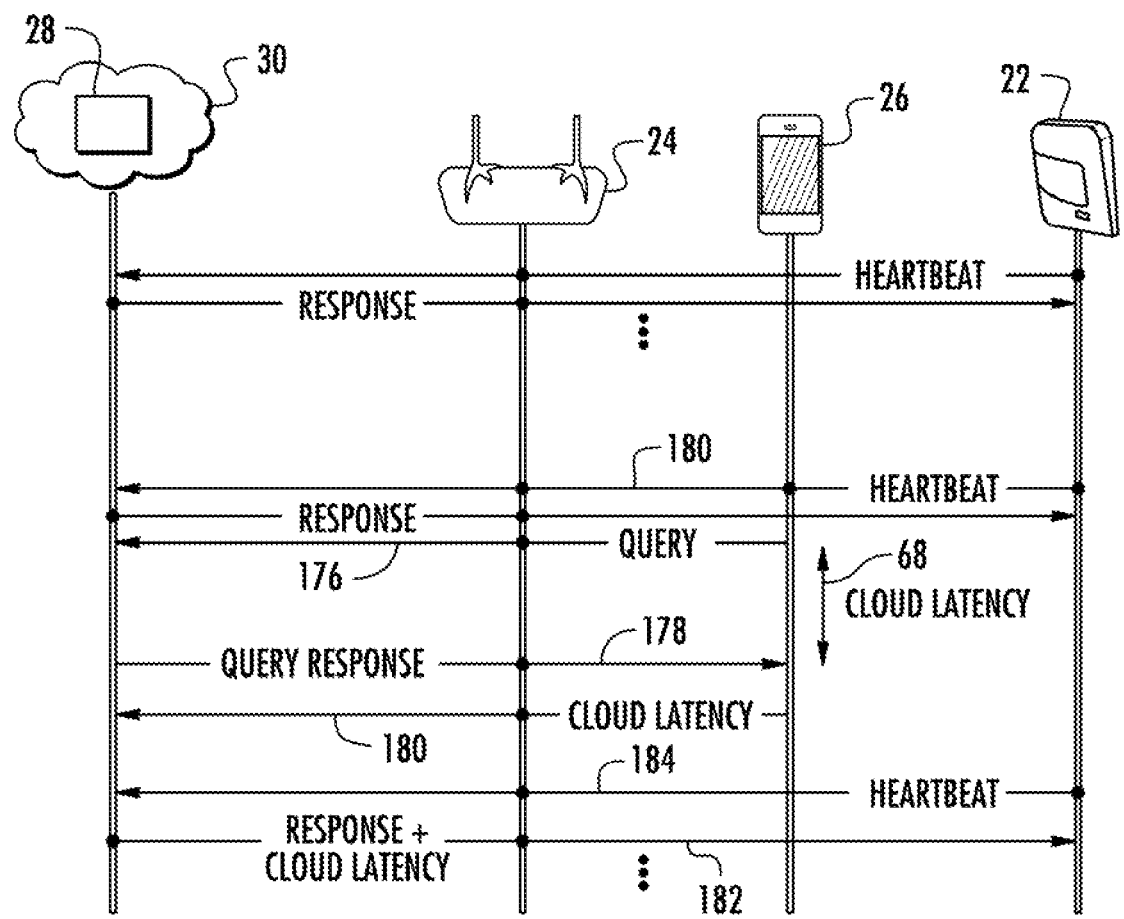
FIG. 7 is a schematic of a method of learning an uplink latency of, for example, a cloud or server of the wireless communication system.

Referring to FIG. 7, a method of measuring uplink latency (see arrow 68) is illustrated, and is applicable with wireless communication systems having low power IoT devices 22 that periodically send heartbeats (i.e., requests) to a server 28 (as examples, see heartbeat 58 in FIG. 2, heartbeat 114 in FIG. 3, and heartbeats 126, 128, 174 in FIG. 5). With continued reference to FIG. 7, the mobile application 26 may send a query 176, through the AP device 24, and to the server 28. The server 28 may then send a query response 178, through the AP device 24, and to the mobile application 26. The time expended, and measured by the mobile application 26 from the instant the mobile application sends the query 176 to the instant the mobile application 26 receives the query response 178 is the uplink latency 68.

Once the uplink latency 68 is measured, the mobile application 26 may send this information, as an uplink latency signal 180, to the server 28. The server 28 may then store and/or buffer the measured uplink latency 68 until the server sends the next heartbeat response 182 to the wireless device 22 in response to a heartbeat 184 from the wireless device 22 that is sent after cloud latency signal 180. That is, the uplink latency 68 may be included as part of the data contained in the heartbeat response 182. The wireless device 22 may then, in-part, adjust sleep state(s) in accordance with the measured uplink latency 68 to, for example, conserve energy expended by the wireless device 22. Because the speed of the server 28 may vary over time, the mobile application 26 may send multiple queries 176, receive multiple query responses 178, and may average the multiple, measured, uplink latencies to achieve an averaged uplink latency value.

It is contemplated and understood that this technique may also be applied to detect the "Buffer Overflow Duration." It may not only detect the predefined buffer timeout duration, but also the time it takes a buffer to get full and start discarding packets due to network congestion.

Advantage and benefits of the present method of measuring uplink latency includes a non-intrusive technique that may be applied to low power, wireless, devices 22 that utilize heartbeats. Other advantages include the acquisition of the uplink latency information without expending additional energy by the wireless device 22, because additional messages are not exchanged with the server 28 to obtain the measurement.

Cloud Initiated, Non-Beacon-Tracking, Wireless, Communication System

Figure 8:
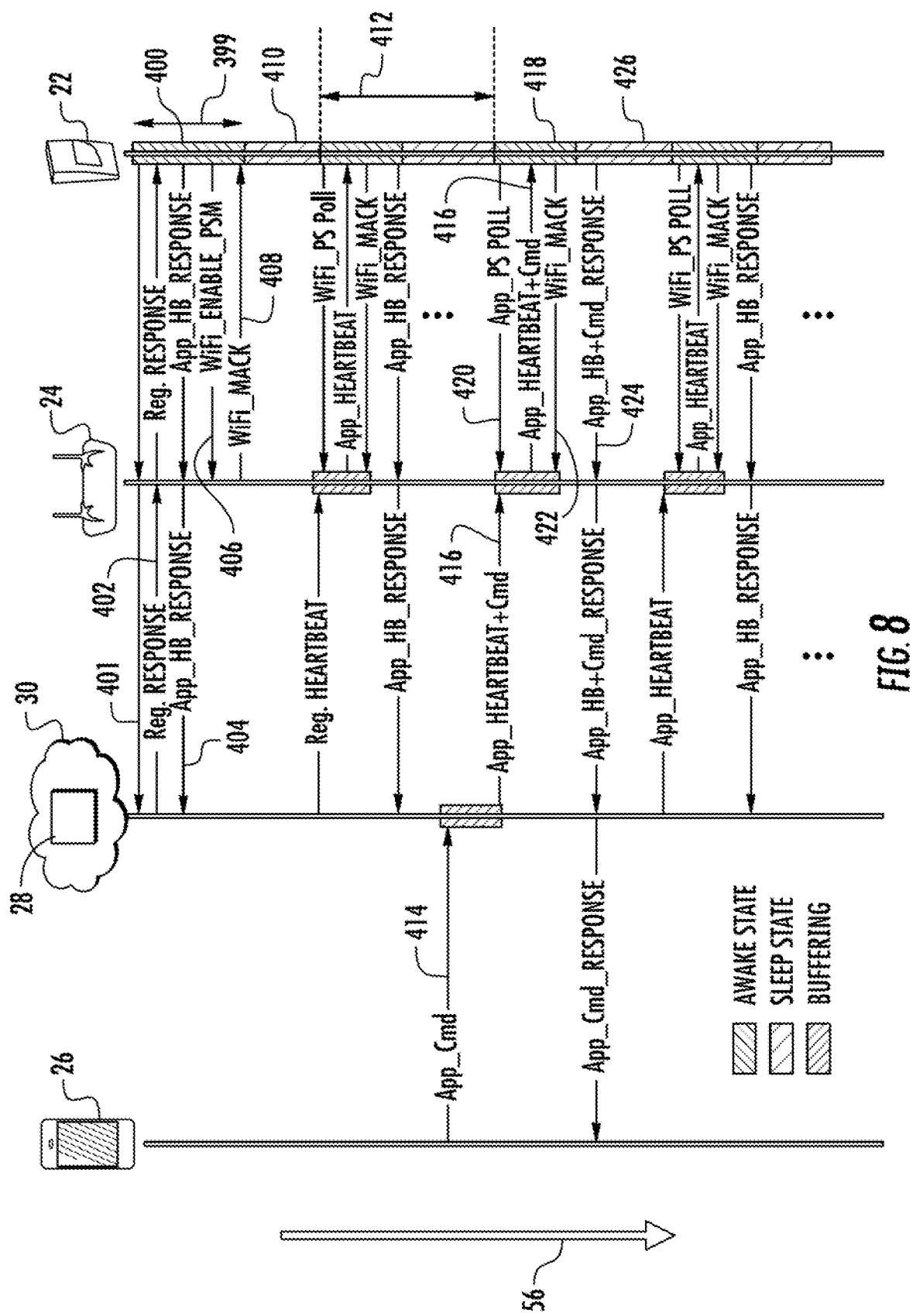
FIG. 8 is a schematic of a "server initiated, non-beacon-tracking, wireless, communication system" as a second embodiment of the wireless communication system.

Referring to FIG. 8, a schematic generally outlining another embodiment of communications between the wireless device 22, the AP device 24, the server 28 (i.e., and/or cloud 30), and the mobile application 26 along a timeline (see arrow 56) is provided. This particular string of communications generally depicts a process wherein energy consumption in Wi-Fi PSM devices 22 may be reduced by eliminating the need of sending heartbeats from the PSM devices 22, and eliminating the tracking of AP beacons, by synchronizing the waking (i.e., entering of the awake state) of the PSM device 22 with cloud 30 initiated requests.

To ensure packets are buffered at the AP device 24, the server 28 may generate a server heartbeat. Attached to the server heartbeat may be a heartbeat interval and any variety of commands for the PSM device 22. In operation, the PSM device 22 will wake up, receive the server heartbeat(s), respond to any commands/requests as part of the heartbeat, and return to a sleep state until expiration of the heartbeat interval 402 as part of the previously sent heartbeat. In case synchronization with the server 28 is lost, the PSM device 22 may remain awake until the next heartbeat (i.e., a full server heartbeat interval) to re-synchronize with the server 28.

More specifically, a wireless communication process may begin with a registration and synchronization phase (see arrow 399) while in an initial awake state 400, wherein the wireless device 22 sends a registration message 401 to the server 28. A registration response 402 containing synchronization information is sent from the server 28 to the wireless device 22 through the AP device 24. The wireless device 22 may then send a synchronizing heartbeat response 404, through the AP device 24, and to the server 28. Also during the synchronization phase 399 and while in the initial awake state 400, the wireless device 22 may send a Wi-Fi enable PSM signal 406 to the AP device 24, and may receive an ACK 408 from the AP device 24 in response. Upon receiving the ACK 408, the wireless device 22 may enter a sleep state 410. The heartbeat 402 may contain information relative to a heartbeat interval (see arrow 412) that represents a duration measured from the instant the wireless device 22 enters an awake state and to the end of the next sleep state. It is understood that in this embodiment, heartbeats are used to synchronize and no difference may exist from one heartbeat to the next.

Figure 9B:
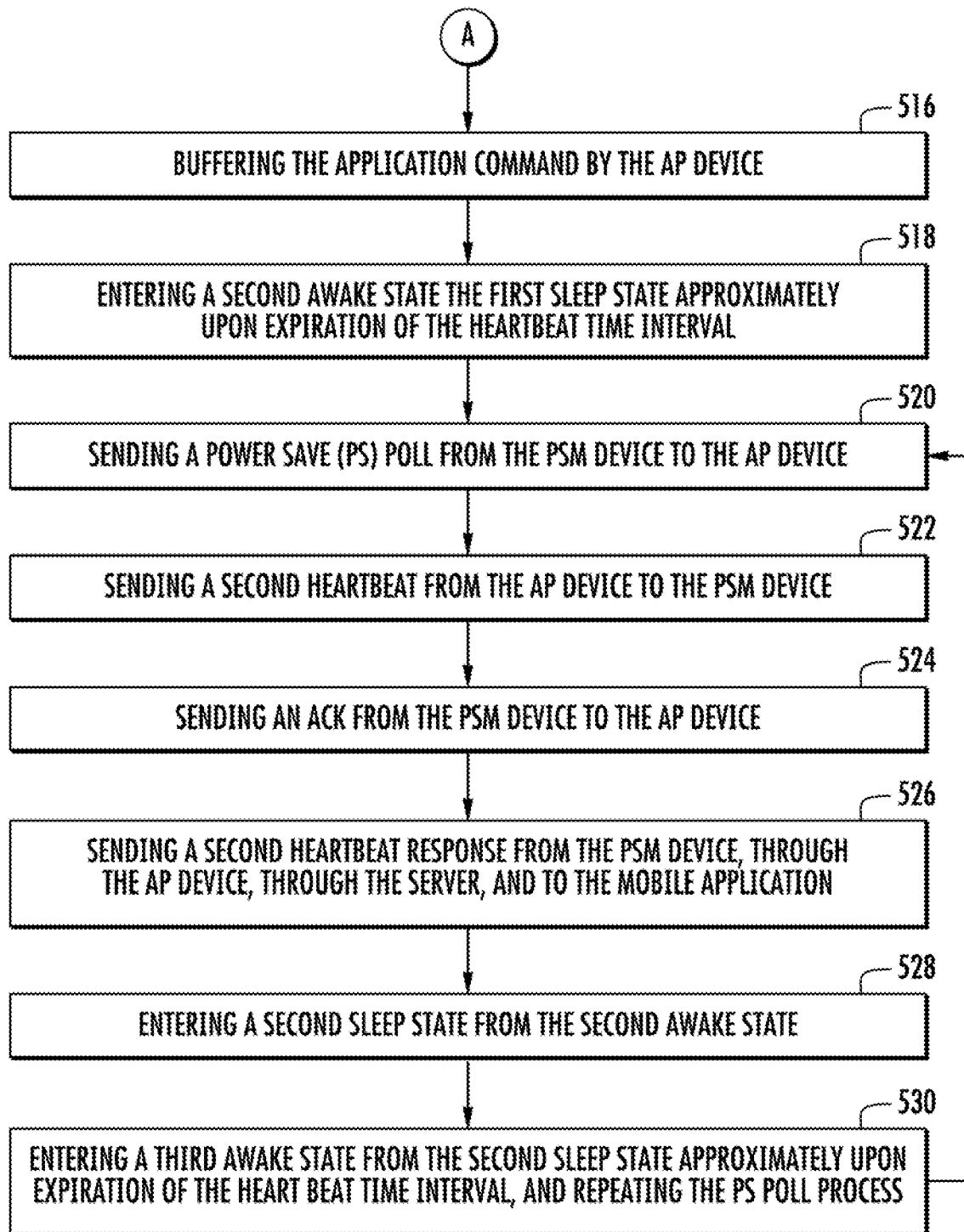

Referring to FIGS. 8, 9A and 9B, a method of operating the "cloud initiated, non-beacon-tracking, wireless, communication system" 20 is generally illustrated. At block 500, the heartbeat 402 may be sent from the server 28, through the AP device 24, and to the wireless device 22 (e.g., PSM device). The heartbeat 402 includes information relative to the heartbeat interval 412 and thus instructs the wireless device 22 when to awake. At block 502, the first heartbeat response 404 is sent from the PSM device 22, through the AP device 24, and to the server 28 for synchronizing the PSM device 22 with the server 28.

At block 504, the Wi-Fi Enable PSM signal 406 is sent from the PSM device 22 to the AP device 24 when in the awake state 400. At block 506, the ACK signal 408 is sent from the AP device 24 to the PSM device 22 in response to the Wi-Fi Enable PSM signal 406. At block 508, the PSM device 22 enters a first sleep state 410 from the first awake state 400. The summation of the durations of first awake state 400 and the first sleep state 410 is about equal to the heartbeat interval 412.

At block 510 and during normal operation, an application command 414 is sent from the mobile application 26 to the server 28. At block 512, the application command 414 may be buffered by the server 28 until the coinciding heartbeat interval 412 has expired. At block 514 and upon expiration of relevant heartbeat interval 412, the buffered application command 414 is advance to the AP device 24 via a second heartbeat 416 sent upon expiration of the coinciding heartbeat interval 412 and initialization of the next interval. At block 516, the second heartbeat 416, and thus the application command 414, may be buffered by the AP device 24. It is contemplated and understood that AP buffering of the heartbeat 416 may not occur, or may be generally short. However, this AP buffering capability provides a degree of system tolerance if the wireless device 22 is not exactly synchronized to the server 28, or to some degree becomes unsynchronized.

At block 518, the wireless device 22 may enter into a second awake state 418 from a previous sleep state, and approximately upon expiration of the coinciding/associated heartbeat time interval 412. At block 520, a Power Save (PS) poll 420 may be sent from the PSM device 22 to the AP device 24. At block 522, the second heartbeat 416 may be sent from the AP device 24 to the PSM device 22. At block 524, an ACK 422 may be sent from the PSM device 22 to the AP device 24. At block 526, a second heartbeat response 424 may be sent from the PSM device 22, through the AP device 24, through the server 28, and to the mobile application 26. At block 528, the PSM device 22 enters a second sleep state 426 from the second awake state 418. At block 530, the PSM device 22 enters a third awake state 428 from the second sleep state 426 approximately upon expiration of the associated heartbeat interval 412, and the PS poll process generally repeats itself.

Advantages and benefits of the "cloud initiated, non-beacon-tracking, wireless, communication system" may include the ability of PSM devices 22 to ignore the AP device 24 beacons, and the extension of time that PSM devices may stay in the sleep state without dropping packets. Other advantages include a non-beacon-tracking method of operation that is more efficient than tradition Wi-Fi PSM because the PSM device 22 does not need to wake up to track beacons, thus the PSM device may sleep for longer time intervals (i.e., up to AP disassociation time). Server synchronization may permit message exchange to start on the server 28 side, reducing the time the device 22 must be active due to the heartbeat generation and uplink latency 68. Moreover, the implementation of this method in a multicore system (i.e., one processor for Wi-Fi communications and another for the application), may become even more efficient since the application core does not need to be woken up if commands are not received by the Wi-Fi core.

The various functions described above may be implemented or supported by a computer program that is formed from computer readable program codes and that is embodied in a computer readable medium. Computer readable program codes may include source codes, object codes, executable codes, and others. Computer readable mediums may be any type of media capable of being accessed by a computer, and may include Read Only Memory (ROM), Random Access Memory (RAM), a hard disk drive, a compact disc (CD), a digital video disc (DVD), or other forms.

Terms used herein such as component, module, system, and the like are intended to refer to a computer-related entity, either hardware, a combination of hardware and software, or software execution. By way of example, a component may be, but is not limited to, a process running on a processor, a processor, an object, an executable, a thread of execution, a program, and/or a computer. It is understood that an application running on a server and the server may be a component. One or more components may reside within a process and/or thread of execution and a component may be localized on one computer and/or distributed between two or more computers.

While the present disclosure is described with reference to exemplary embodiments, it will be understood by those skilled in the art that various changes may be made and equivalents may be substituted without departing from the spirit and scope of the present disclosure. In addition, various modifications may be applied to adapt the teachings of the present disclosure to particular situations, applications, and/or materials, without departing from the essential scope thereof. The present disclosure is thus not limited to the particular examples disclosed herein, but includes all embodiments falling within the scope of the appended claims.

What is claimed is:

1. A method of operating a wireless communication system comprising:
   sending a first heartbeat from a server, through a gateway, and to a wireless device, wherein the first heartbeat includes at least a heartbeat interval;
   sending a first heartbeat response from the wireless device, through the gateway, and to the server for synchronizing the wireless device with the server; and
   changing from a first awake state to a first sleep state, wherein the first sleep state extends for a duration associated with the heartbeat interval, wherein the first heartbeat is buffered by the gateway and the wireless device is a PSM device.

2. The method set forth in claim 1, further comprising:
   broadcasting an acknowledgement signal from the gateway to the PSM device in response to the Wi-Fi Enable PSM signal, and when in the awake state.

3. A method of operating a wireless communication system comprising:
   sending a first heartbeat from a server, through a gateway, and to a wireless device, wherein the first heartbeat includes at least a heartbeat interval;
   sending a first heartbeat response from the wireless device, through the gateway, and to the server for synchronizing the wireless device with the server; and
   changing from a first awake state to a first sleep state, wherein the first sleep state extends for a duration associated with the heartbeat interval, wherein the heartbeat interval is about equal to combined durations of the first awake state and the first sleep state.

4. A method of operating a wireless communication system comprising:
sending a first heartbeat from a server, through a gateway, and to a wireless device, wherein the first heartbeat includes at least a heartbeat interval;
sending a first heartbeat response from the wireless device, through the gateway, and to the server for synchronizing the wireless device with the server;
changing from a first awake state to a first sleep state, wherein the first sleep state extends for a duration associated with the heartbeat interval;
sending a Wi-Fi Enable Power Save Mode (PSM) signal from the wireless device to the gateway when in the awake state, wherein the gateway is an Access Point (AP) device and the wireless device is a PSM device;
sending an application command to the server;
buffering the application command by the server; and
sending a second heartbeat that includes the application command from the server to the wireless device, upon expiration of the time interval.

5. The method set forth in claim 4, further comprising:
buffering the application command by the gateway;
entering a second awake state from the first sleep state approximately upon expiration of the heartbeat time interval;
sending a Power Save (PS) poll from the wireless device to the gateway; and
broadcasting the second heartbeat from the gateway and to the wireless device.

6. The method set forth in claim 5, wherein the application command is sent to the server by a mobile application.

7. The method set forth in claim 6, further comprising:
sending a second heartbeat response from the wireless device, through the gateway, through the server, and to the mobile application; and
entering a second sleep state from the second awake state.

8. The method set forth in claim 7, wherein the wireless device is configured to ignore any beacons broadcasted by the gateway.

9. A wireless communication system comprising:
a gateway;
a server configured to send a heartbeat of a plurality of heartbeats to the gateway upon expiration of a respective heartbeat interval of a plurality of heartbeat intervals; and
a wireless device configured to retrieve a heartbeat of the plurality of heartbeats, wherein the wireless device is a Power Save Mode (PSM) device configured to send a plurality of PS polls to the gateway, wherein each PS poll of the plurality of PS polls retrieves a respective heartbeat of the plurality of heartbeats.

10. The wireless communication system set forth in claim 9, wherein each heartbeat interval of the plurality of heartbeat intervals equals the combined duration of an awake state and a sleep state.

11. The wireless communication system set forth in claim 9, further comprising:
a mobile application configured to send a mobile command to the server, wherein the server is configured to buffer the mobile command until the next heartbeat of the plurality of heartbeats is sent to the wireless device and buffered by the gateway, whereupon the mobile command becomes part of the next heartbeat.

12. The wireless communication system set forth in claim 11, wherein the server is part of a cloud.

13. The wireless communication system set forth in claim 11, wherein each PS poll of the plurality of PS polls is sent to the gateway approximately upon expiration of a respective heartbeat time duration of the plurality of heartbeat time durations.

* * * * *